United States Patent [19]
Waltz

[11] Patent Number: 5,657,194
[45] Date of Patent: Aug. 12, 1997

[54] CIRCUIT AND METHOD FOR AUTOMATICALLY RESETTING A SOLID STATE RELAY

[75] Inventor: Richard W. Waltz, Franklin, Wis.

[73] Assignee: Allen-Bradley Company, Inc., Milwaukee, Wis.

[21] Appl. No.: 508,771

[22] Filed: Jul. 28, 1995

[51] Int. Cl.$^6$ .................................................... H02H 5/00
[52] U.S. Cl. ................... 361/75; 361/59; 361/71
[58] Field of Search ........................... 361/75, 71, 59

[56] References Cited

U.S. PATENT DOCUMENTS

| | | | |
|---|---|---|---|
| 5,319,514 | 6/1994 | Walsh et al. | 361/75 |
| 5,332,986 | 7/1994 | Wieloch | 335/78 |

*Primary Examiner*—Jeffrey A. Gaffin
*Assistant Examiner*—Sally C. Medley
*Attorney, Agent, or Firm*—Patrick S. Yoder; John M. Miller; John J. Horn

[57] ABSTRACT

A reset circuit for an overload relay includes a timing circuit coupled to a switching circuit for automatically resetting the relay a predetermined time after a trip. The timing circuit includes a capacitor and a resistor in parallel with a reset coil. The capacitor is charged during normal operation and begins to discharge through the resistor following a trip at a first rate determined by the size of the resistor. The switching circuit includes a pair of transistors, a pair of capacitors and a pair of resistors. When the capacitor in the timing circuit has discharged a predetermined amount following a trip, the switching circuit is triggered and couples the capacitor to ground through one of the transistors, causing a rush of current through the reset coil sufficient to reset the relay.

16 Claims, 3 Drawing Sheets

CIRCUIT AND METHOD FOR AUTOMATICALLY RESETTING A SOLID STATE RELAY

BACKGROUND OF THE INVENTION

The present invention relates generally to the art of solid state relays for protecting electrical components such as electric motors. More particularly, the invention relates to a circuit and a method for automatically resetting a solid state relay a predetermined time after a trip to permit equipment coupled to the relay to resume operation.

In recent years a number of improved protection devices have become available for electrical machines such as single and polyphase motors. Such devices typically offer protection against electrical system malfunctions such as overload, short circuit, phase loss and the like that would otherwise cause permanent damage to the machines. As advancements in the design and manufacture of solid state circuitry have appeared, conventional overload protection devices have increasingly been designed to incorporate such circuitry, thereby often reducing the unit cost of the devices while providing enhanced and more reliable performance.

Commercially available overload relays, for example, currently include extremely rapid solid state analog or digital circuitry capable of interrupting power to a protected device in the event of overload, phase loss, ground fault or other failure. Solid state overload relays of this type are commonly available in relatively compact, affordable packages that can be easily installed and serviced. In addition to circuitry for detecting fault conditions, such relays also commonly include power supply circuitry for storing energy from the load circuit being controlled. The power supply circuitry is coupled to an interrupter coil, permitting the device to energize the coil and interrupt power to the load without the necessity of a separate, independent power supply. Such packages typically also include mechanical or electro-mechanical hardware permitting an operator to manually reset the device or to verify its operability, such as by depressing a test button. An overload relay generally of this type is described in U.S. Pat. No. 5,332,986, issued to Christopher Wieloch on Jul. 26, 1994 and assigned to Allen-Bradley Company, Inc. of Milwaukee, Wis.

In addition to failure detection and power circuitry, it is often desirable in overload protection devices, such as overload relays, to provide circuitry for resetting the device to a conducting state once a predetermined time has passed after a trip. In earlier mechanical devices, a bimetallic switch or similar arrangement was used to mimic the cooling of the protected machinery, resetting the device automatically after the switch had sufficiently cooled to close contacts in the relay. More modem devices commonly employ digital technology, typically including a programmed microprocessor to model cooling of the machinery, automatically resetting the device based upon the temperature predicted by the model. However, for lower power or less critical applications, digital devices of this type are often prohibitably expensive.

There is a need, therefore, for an automatic reset circuit, particularly for solid state overload relays, comprised of analog circuit components that can be manufactured at substantially lower cost than programmable digital circuitry adaptable to carry out an automatic reset function. In particular, there is a need for an automatic reset circuit for such relays that stores energy for driving a reset coil from the same power circuit used to drive the relay trip coil. Moreover, such a reset circuit should advantageously include a minimum number of circuit components and be susceptible to mass production by known integrated circuit manufacturing techniques.

SUMMARY OF THE INVENTION

The present invention features a novel circuit and method for resetting a relay designed to respond to these needs. The circuit includes a timing or delay arrangement for preventing automatic resetting of the relay before a predetermined mount of time has elapsed since a trip. The circuit is designed to store energy for resetting the relay and is preferably coupled to a common power source in the relay that also serves to provide trip power for a trip coil. The circuit retains stored energy after a trip occurs and uses the energy to drive the timing portion of the circuit. In a particularly preferred embodiment, a capacitor included in the timing circuit also stores the energy needed to drive the reset coil. A reset switching arrangement in the circuit is coupled to the timing portion and grounds the energy storage capacitor after the predetermined amount of time has elapsed, thereby causing a current rush through a reset coil sufficient to reset the relay. The components of the circuit are all susceptible to mass production and may be easily incorporated in a unitary circuit package, such as on an application specific integrated circuit.

Thus, in accordance with a first aspect of the invention, a circuit is provided for resetting a relay of the type including contacts for interrupting electrical power to a load in response to a fault condition and a reset coil for closing the contacts to permit flow of electrical power to the load. The circuit includes an energy storage element, an analog timing circuit and a switching circuit. The energy storage element stores electrical energy prior to interruption of power to the load and may be advantageously coupled to a common power supply circuit provided in the relay. The timing circuit includes a resistor and a capacitor network. Timing circuit stores electrical energy prior to interruption of power to the load and drains energy at a predetermined rate through a reset period after interruption of power to the load. The switching circuit is coupled to the timing circuit and to the energy storage element and includes a switching element coupled to the reset coil. The switching element permits flow of electrical current from the energy storage element through the reset coil to reset the relay when the timing circuit has drained a predetermined amount of energy.

In a particularly preferred embodiment of the reset circuit, described in detail below, the energy storage element is a capacitor and is included in the timing circuit. Thus, in this embodiment, the energy storage element serves both to determine when the reset period has elapsed and to provide the power necessary to energize the reset coil and thereby to reset the relay.

In accordance with another aspect of the invention, a motor protection relay is provided for coupling and interrupting power to an electric motor. The relay includes contacts for selectively coupling and interrupting power to the motor and a trip mechanism including a trip coil for opening the contacts in response to a trip condition. The relay also includes a reset circuit including a reset coil for automatically closing the contacts after a predetermined reset period has elapsed after a trip. The reset circuit includes a capacitor and a resistor. The capacitor stores electrical energy prior to interruption of power to the motor and drains energy through the resistor at a predetermined rate through the reset period. The switching circuit is coupled to the timing circuit and includes a switching element coupled to the reset coil. The switching element permits flow of electrical current from the capacitor through the reset coil to reset the contacts when the timing circuit has drained a predetermined mount of energy.

In accordance with still another aspect of the invention, a method is provided for resetting a relay of the type including a set of contacts for selectively coupling and interrupting electrical power to a load, such as an electric motor, a trip coil for opening the contacts in response to a trip condition and a reset coil for closing the contacts a predetermined reset time after a trip. The method includes the steps of charging a capacitor prior to a trip, partially discharging the capacitor at a first rate following the trip and discharging the capacitor through the reset coil at a second rate higher than the first rate to reset the relay once the reset time has elapsed. In the particularly preferred embodiment described below, the capacitor discharges at the first rate through a resistor until the voltage across the capacitor falls to a preset threshold voltage. Once the threshold voltage is reached, a switching element couples the capacitor to ground through the reset coil, causing the capacitor to discharge rapidly through the coil, resetting the relay.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
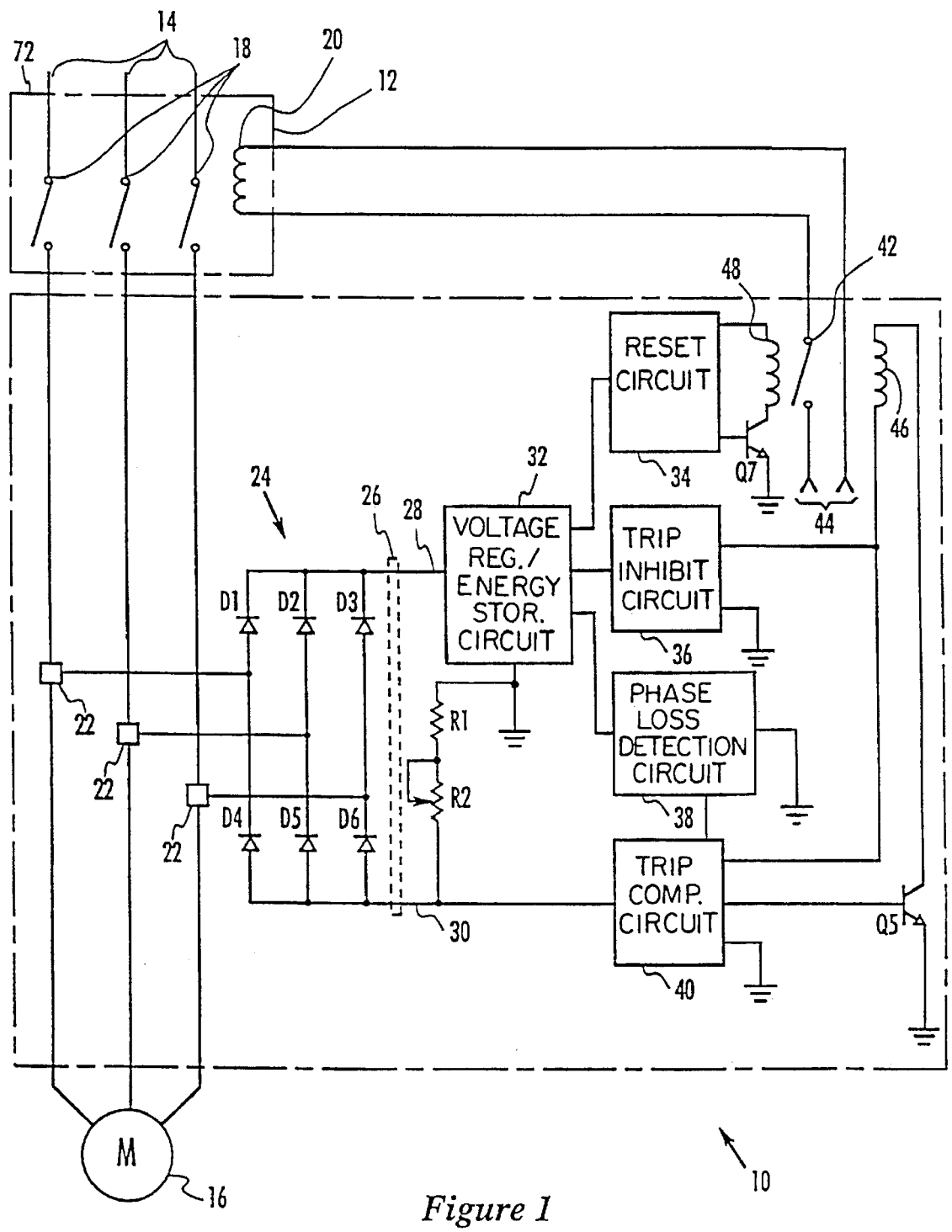
FIG. 1 is a block diagram of a solid state relay, including a reset circuit in accordance with the present invention, coupled to phase conductors supplying power to an electric motor.

Turning now to the drawings and referring to FIG. 1, an exemplary relay 10 in accordance with the present invention is illustrated schematically as it would be installed between a contactor 12 for selectively coupling and interrupting power from incoming power conductors 14, such as three-phase conductors, to a load 16, such as a three-phase induction motor. Contactor 12 includes contacts 18 and a coil 20 for controlling contacts 18 in a manner well known in the art. Thus, current through coil 20 causes contacts 18 to close, providing power to motor 16 through relay 10.

Relay 10 includes current transformers 22 electromagnetically coupled to each phase conductor 14, providing power for operation of relay 10 and permitting relay 10 to monitor the current flowing to motor 16 as described below. Current transformers 22 are in turn coupled to a full wave rectifier circuit 24, including diodes D1, D2, D3, D4, D5 and D6, which effectively convert three-phase power drawn by transformers 22 to relatively constant direct current power during normal operation (i.e. when no detectable fault condition is present). Rectifier circuit 24 outputs this direct current along a bus 26 including a high side 28 and a low side 30 for use in the various power and detection circuits described below.

Figure 2:
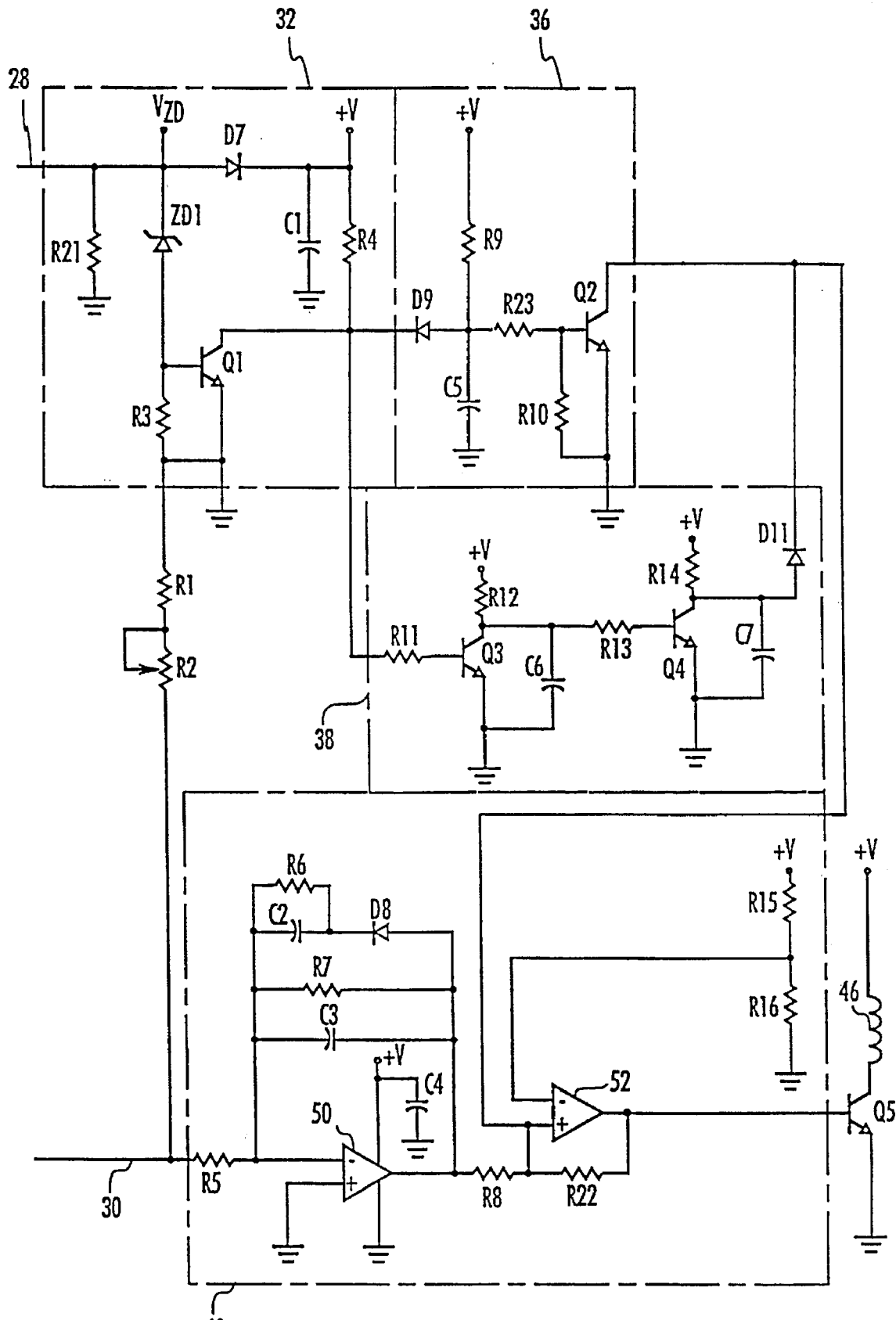
FIG. 2 is a schematic diagram illustrating typical components and their interconnection to form the various internal circuits represented in FIG. 1.

As illustrated in FIG. 1, relay 10 includes several interconnected circuits, including a voltage regulating and trip energy storage circuit 32, a reset circuit 34, a trip inhibit circuit 36, a phase loss detection circuit 38 and a current time integration and trip comparator circuit 40. Voltage regulating and trip energy storage circuit 32 is coupled to the high side 28 of bus 26 and supplies regulated voltage power to the other circuits of relay 10. Voltage regulating and trip energy storage circuit 32 is coupled to low side 30 of bus 26 via a pair of resistors R1 and R2 as shown in FIGS. 1 and 2. Resistor R2 is a variable resistor or potentiometer and the combination of resistors R1 and R2 preferably provide manual overload current range adjustment of up to approximately 3.2:1 of the rated current capacity of relay 10.

As illustrated in FIG. 2, voltage regulating and trip energy storage circuit 32 is coupled to high side 28 of bus 26 and preferably includes a diode D7, a Zener diode ZD1, a capacitor C1, a transistor Q1 and resistors R3, R4 and R21 interconnected substantially as shown. Trip inhibit circuit 36 includes a diode D9, a capacitor C5, a transistor Q2 and resistors R9, R10 and R23 interconnected substantially as shown. Phase loss detection circuit 38 includes a diode D11, a pair of capacitors C6 and C7, a pair of transistors Q3 and Q4 and resistors R11, R12, R13 and R14 interconnected substantially as illustrated. Current time integration and trip comparator circuit 40 includes operational amplifiers 50 and 52, a diode D8, capacitors C2, C3 and C4, and resistors R5, R6, R7, R8, R15, R16 and R22 interconnected substantially as shown. Preferred values and designations for the components of this circuitry are as follows:

| | |
|---|---|
| D1–D11 | 1N4448 diodes, |
| ZD1 | 1N5239B (9.1 v) Zener diode, |
| Q1–Q4 | 2N3904 transistors, |
| 50 and 52 | operational amplifiers (SGS Thomson TS27L2CN), |
| C1 | 220 µF, 10 v electrolytic capacitor (Nichicon UVZ1A221MEH), |
| C2 | 47 µF, 10 v electrolytic capacitor (Nichicon UVA1A470MDH), |
| C3–C5 | .1 µF ceramic capacitors, |
| C6 | .22 µF, 50 v ceramic capacitor, |
| C7 | 3.3 µF, 50 v electrolytic capacitor (Nichicon UVZ1H3R3MDH), |
| R1 | 66.5 Ω, 1% metal film resistor, |
| R2 | 200 Ω potentiometer, |
| R3 | 20 KΩ, 5% carbon film resistor, |
| R4 | 1 MΩ, 5% carbon film resistor, |
| R5 | 80.6 KΩ, 1% metal film resistor, |
| R6 | 4.32 MΩ, 1% metal film resistor, |
| R7 | 3.01 MΩ, 1% metal film resistor, |
| R8 | 1.00 MΩ, 1% metal film resistor, |
| R9–R13, R23 | 2 MΩ, 5% carbon film resistors, |
| R14 | 510 KΩ, 5% carbon film resistor, |
| R15 | 2.34 MΩ, 1% metal film resistor, |
| R16 | 909 KΩ, 1% metal film resistor, |
| R21 | 200 KΩ, 5% carbon film resistor, |
| R22 | 2.49 MΩ, 1% metal film resistor. |

Returning briefly to FIG. 1, relay 10 also includes contacts 42 electrically coupled to coil 20 for selectively coupling and interrupting power to coil 20 from external circuitry (not shown) through input and output lines 44. Circuitry coupled to lines 44 will typically be incorporated in a control device or panel, including start and stop push buttons and the like. A trip coil 46 is provided in relay 10 and may be energized by closing a switching device, such as a transistor Q5 to open contacts 42, thereby interrupting power to coil 20 and opening contacts 18 to interrupt power to motor 16. In the preferred embodiment, transistor Q5 is a Dartington transistor (e.g. model MPSA13), the base of which is coupled to operational amplifier 52 of circuit 40. Reset circuit 34 serves to automatically close contacts 42, thereby resetting relay 10 as described more fully below. Thus, reset circuit 34 is configured to energize a reset coil 48 by closing a switching device Q7, which is preferably a transistor, such as model MPS6601.

In operation, once contacts 18 of contactor 12 are closed to supply power to motor 12, full wave rectifying circuit 24 provides essentially direct current to voltage regulating and trip energy storage circuit 32. Regulated power is in turn applied by circuit 32 to circuits 34, 36, 38 and 40. Energy for powering trip coil 46 is stored in circuit 32 during normal (i.e. non-tripped) operation.

During operation, current time integration and trip comparison circuit 40 and phase loss detection circuit 38 monitor the output of voltage regulating and trip energy storage circuit 32 and cause operational amplifier 52, functioning as a comparator, to apply a base voltage to transistor Q5 and thereby to energize coil 46 to interrupt power to motor 16. More specifically, upon loss of power in a one of phase conductors 14, current output of rectifying circuit 24 goes to zero for a brief period, causing transistor Q1 to assume a non-conducting state, providing base drive on transistor Q3 and discharging capacitor C6 through transistor Q3. A lower output value from capacitor C6 eventually causes transistor Q4 to assume a non-conducting state, allowing capacitor C7 to charge. When the voltage at a junction between capacitor C7 and diode D11 reaches approximately 3.5 volts, operational amplifier 52 applies a base voltage to transistor Q5 sufficient to place transistor Q5 in a conducting state, electrically coupling trip coil 46 to ground, causing a phase loss interruption. Resistor R14 and capacitor C7 provide a delay for such phase loss trips, typically tripping relay 10 only after a phase loss condition has persisted for a predetermined time period.

Similarly, relay 10 trips to interrupt power to motor 16 in the event of an overload or locked rotor condition. Specifically, in the place of a bimetallic relay arrangement, current time integration and trip circuit 40 includes a resistor-capacitor network including resistor R6 and capacitor C2. Resistor R6 and capacitor C2 models the thermal heating and cooling of motor 16 and cause operational amplifier 52 to apply a base voltage to transistor Q5 sufficient to place transistor Q5 in a conducting state and thereby to energize trip coil 46 in response to overload conditions that would otherwise result in damage to motor 16.

Relay 10 is preferably configured for either manual or automatic resetting. A typical manual resetting arrangement that can be incorporated into relay 10 is described in U.S. Pat. No. 5,332,986, which is hereby incorporated herein by reference. Automatic resetting a predetermined time following a trip is provided by reset circuit 34 as described below.

Figure 3:
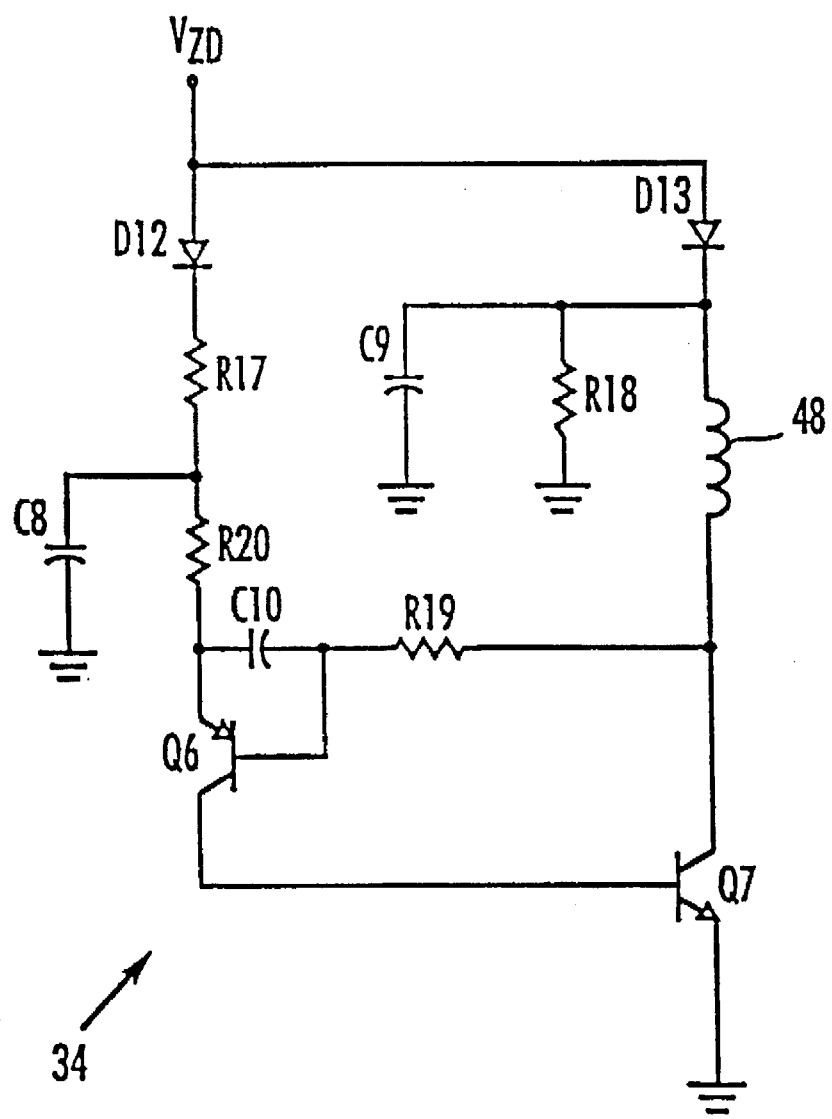
FIG. 3 is a schematic diagram illustrating a preferred configuration of a reset circuit in accordance with the invention for resetting the relay shown in FIG. 1.

The preferred configuration of reset circuit 34 is illustrated in FIG. 3. As shown in FIG. 3, reset circuit includes a pair of diodes D12 and D13, capacitors C8, C9, C10, a pair of transistors Q6 and Q7 and resistors R17, R18, R19 and R20 interconnected substantially as shown. Preferred values and designations for these components are as follows:

| D12 and D13 | 1N4448 diodes, |
| Q6 | 2N5087 transistor, |
| Q7 | MPS6601 transistor, |
| C8 | 100 µF, 16 v electrolytic capacitor (Nichicon UVZ1H3R3MDH), |
| C9 | 470 µF, 10 v electrolytic capacitor |

-continued

| | (Nichicon UVZ1C101MDH), |
| C10 | .01 µF ceramic capacitor, |
| R17 | 10 KΩ, 5% carbon film resistor, |
| R18 | 2 MΩ, 5% carbon film resistor, |
| R19 | 100 KΩ, 5% carbon film resistor, |
| R20 | 75 Ω, 5% carbon film resistor. |

Reset circuit 34 is coupled to voltage regulating and trip energy storage circuit 32 which serves as a power supply for resetting relay 10 after a trip. During normal operation of relay 10 prior to a trip, capacitors C8 and C9 are charged substantially to $V_{ZD}$. Following a trip, energy stored in capacitors C8 and C9 is retained by diodes D12 and D13. At the same time, capacitor C9 begins to discharge through resistor R18 at a rate determined by the resistance of R18. Capacitor C8 remains substantially at voltage $V_{ZD}$ because transistor Q6 is in a non-conducting state. Capacitor C10 serves to filter out voltage transients across the base-emitter junction of transistor Q6 caused by external electromagnetic fields that might otherwise cause Q6 to change state prematurely. Because no current flows through coil 48 and resistor R19, the base of transistor Q6 remains substantially at the same voltage as capacitor C9. The discharging of capacitor C10 progressively leads to a voltage differential across transistor Q6 sufficient to change the conducting state of transistor Q6. When this differential voltage reaches approximately 0.6 volts, transistor Q6 conducts energy from capacitor C8 to the base of transistor Q7, placing transistor Q7 in a conducting state and thereby coupling capacitor C9 to ground through reset coil 48. Capacitor C9 then discharges at a high rate through reset coil 48, drawing contacts 42 closed and resetting relay 10. After resetting, once capacitors C8 and C9 have had sufficient time to recharge, reset circuit 34 is again ready to reset relay 10 after a subsequent trip.

It should be noted that while the various circuits and components described above may be assembled in accordance with any known technique, they are particularly suited to incorporation in an application specific integrated circuit. Moreover, by using analog circuitry and solid state components, the overall cost of relay 10 is significantly reduced as compared to conventional protection devices. In addition, performance, particularly with respect to the speed of operation, is enhanced. With respect to reset circuit 34, it should also be noted that in the preferred embodiment described, capacitor C9 serves the dual role providing a timing out function and of storing and providing energy for energizing reset coil 48. More specifically, capacitor C9 and resistor R18 form a resistor-capacitor network in which capacitor C9 discharges at a specific rate following a trip. As will be appreciated by those skilled in the art, resistor 18 is selected to provide a precise, predetermined reset time period. Also, transistors Q6 and Q7, along with capacitors C8 and C10, and resistors R19 and R20 define a switching circuit, causing transistor Q7 to close and discharge capacitor C9 at a higher rate once the reset period has elapsed.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, a separate energy storage element may be provided in reset circuit 34 for storing and supplying energy needed to energize reset coil 48. Also, while in the embodiment described above resistor R18 has a fixed resistance, a variable resistor may be provided in its place to allow the reset period to be varied.

I claim:

1. A circuit for resetting a relay of the type including contacts for interrupting electrical power to a load in response to a fault condition and a reset coil for closing the contacts to permit flow of electrical power to the load, the circuit comprising:

an energy storage and timing circuit including a capacitor for storing electrical energy prior to occurrence of the fault condition and a resistor, the capacitor storing electrical energy prior to interruption of electrical power to the load and discharging energy through the resistor at a predetermined rate through a reset period following occurrence of the fault condition and through the reset coil following expiration of the reset period; and a switching circuit coupled to the energy storage and timing circuit, the switching circuit including a switching element coupled to the reset coil, the switching element permitting flow of electrical current from the capacitor through the reset coil following expiration of the reset period to reset the relay.

2. The circuit of claim 1, wherein the relay includes a power supply circuit and the capacitor is coupled to the power supply circuit and stores electrical energy from the power supply circuit prior to occurrence of the fault condition.

3. The circuit of claim 1, wherein as energy is discharged from the energy storage and timing circuit a timing voltage is reduced and wherein the switching circuit couples the reset coil to ground when the timing voltage falls below a predetermined voltage.

4. The circuit of claim 3, wherein the switching circuit includes a capacitor for maintaining substantially the predetermined voltage throughout the reset period.

5. A motor protection relay for coupling and interrupting power to an electric motor, the relay comprising:

contacts for selectively coupling and interrupting power to the motor;

a trip mechanism including a trip coil for opening the contacts in response to a trip condition;

a reset circuit including a reset coil for automatically closing the contacts after a predetermined reset period has elapsed after a trip, the reset circuit further including a timing circuit and a switching circuit, the timing circuit including a capacitor and a resistor, the capacitor storing electrical energy prior to interruption of electrical power to the motor and draining energy through the resistor at a predetermined rate through the reset period, the switching circuit being coupled to the timing circuit and including a switching element coupled to the reset coil, the switching element permitting flow of electrical current from the capacitor through the reset coil to reset the contacts when the timing circuit has drained a predetermined amount of energy.

6. The relay of claim 5, further comprising a power supply circuit for supplying power to the trip mechanism and to the reset circuit.

7. The relay of claim 5, further comprising a phase loss detection circuit coupled to the trip mechanism for interrupting power to the motor in response to loss of power in a phase conductor supplying power to the motor.

8. The relay of claim 5, wherein as energy is drained from the timing circuit a timing voltage is reduced and wherein the switching circuit couples the reset coil to ground when the timing voltage falls below a predetermined voltage.

9. The relay of claim 8, wherein the switching circuit includes a capacitor for maintaining substantially the predetermined voltage throughout the reset period.

10. A method for resetting a relay of the type including a set of contacts for selectively coupling and interrupting electrical power to a load, such as an electric motor, a trip coil for opening the contacts in response to a trip condition and a reset coil for closing the contacts a predetermined reset time after a trip, the method comprising the steps of:

(a) charging a capacitor prior to the trip;

(b) partially discharging the capacitor at a first rate following the trip;

(c) discharging the capacitor through the reset coil at a second rate higher than the first rate to reset the relay once the reset time has elapsed.

11. The method of claim 10, wherein the capacitor discharges at the first rate through a resistor and discharges at the second rate through the reset coil.

12. The method of claim 10, wherein the capacitor is coupled to a resistor, the resistor having a resistance determinative of the reset time.

13. The method of claim 10, including the further step of comparing a voltage across the capacitor to a predetermined voltage as the capacitor is discharged during step (b).

14. The method of claim 13, wherein step (c) begins when the voltage across the capacitor has fallen a preset amount below the predetermined voltage.

15. The method of claim 10, wherein at step (c) the reset coil is coupled to ground through a switching element, whereby the capacitor discharges to ground through the reset coil and the switching element.

16. The method of claim 10, wherein the relay includes a power supply circuit and the capacitor is charged during step (a) by the power supply circuit.

* * * * *